US009886579B2

(12) United States Patent
Sallam

(10) Patent No.: US 9,886,579 B2
(45) Date of Patent: Feb. 6, 2018

(54) METHOD AND SYSTEM FOR PROACTIVE DETECTION OF MALICIOUS SHARED LIBRARIES VIA A REMOTE REPUTATION SYSTEM

(71) Applicant: McAfee, Inc, Santa Clara, CA (US)

(72) Inventor: Ahmed S. Sallam, Cupertino, CA (US)

(73) Assignee: MCAFEE, LLC, Santa Clara, CA (US)

( * ) Notice: Subject to any disclaimer, the term of this patent is extended or adjusted under 35 U.S.C. 154(b) by 67 days.

(21) Appl. No.: 14/581,124

(22) Filed: Dec. 23, 2014

(65) Prior Publication Data
US 2015/0113650 A1 Apr. 23, 2015

Related U.S. Application Data

(63) Continuation of application No. 12/695,005, filed on Jan. 27, 2010, now Pat. No. 8,955,131.

(51) Int. Cl.
*G06F 21/56* (2013.01)
(52) U.S. Cl.
CPC ............ G06F 21/56 (2013.01); G06F 21/562 (2013.01); G06F 21/567 (2013.01); G06F 21/568 (2013.01)
(58) Field of Classification Search
CPC ...... G06F 21/56; G06F 21/562; G06F 21/567; G06F 21/568; G06F 21/55; G06F 21/50; G06F 21/00; H04L 29/06911; H04L 29/06551; H04L 29/02; H04L 29/00; H04L 29/06925; H04L 29/06931; H04L 29/06938
USPC .......................................................... 726/23
See application file for complete search history.

(56) References Cited

U.S. PATENT DOCUMENTS

| 5,440,723 | A | 8/1995 | Arnold et al. |
| 5,796,989 | A | 8/1998 | Morley et al. .................. 703/26 |
| 5,826,013 | A | 10/1998 | Nachenberg |
| 6,240,530 | B1 | 5/2001 | Togawa ..................... 714/38.13 |
| 6,598,112 | B1 | 7/2003 | Jordan et al. ..................... 711/2 |
| 6,973,578 | B1 | 12/2005 | McIchionc |
| 6,986,042 | B2 | 1/2006 | Griffin .......................... 713/164 |
| 7,069,589 | B2 | 6/2006 | Schmall et al. |
| 7,137,039 | B2 | 11/2006 | Durrant et al. .............. 714/47.2 |
| 7,363,657 | B2 | 4/2008 | Caccavale ...................... 709/229 |
| 7,530,106 | B1 | 5/2009 | Zaitsev et al. .................. 726/24 |
| 7,725,941 | B1 | 5/2010 | Pavlyushchik |

(Continued)

FOREIGN PATENT DOCUMENTS

GB 2466922 A 7/2010

OTHER PUBLICATIONS

"Dynamic-link library", Wikipedia, downloaded Jul. 23, 2017, pp. 1-10.*

(Continued)

*Primary Examiner* — William Goodchild
(74) *Attorney, Agent, or Firm* — Baker Botts L.L.P.

(57) ABSTRACT

A method for proactively detecting shared libraries suspected of association with malware includes the steps of determining one or more shared libraries loaded on an electronic device, determining that one or more of the shared libraries include suspicious shared libraries by determining that the shared library is associated with indications that the shared library may have been maliciously injected, loaded, and/or operating on the electronic device, and identifying the suspicious shared libraries to a reputation server.

15 Claims, 9 Drawing Sheets

(56) References Cited

U.S. PATENT DOCUMENTS

| | | | |
|---|---|---|---|
| 7,730,040 B2 | 6/2010 | Reasor et al. | |
| 7,765,481 B2 | 7/2010 | Dixon et al. | |
| 7,788,359 B2 | 8/2010 | Lund et al. | |
| 7,890,627 B1 | 2/2011 | Thomas | |
| 8,001,606 B1 | 8/2011 | Spertus | |
| 8,112,806 B1 | 2/2012 | Sobel et al. | 726/24 |
| 8,132,057 B2 | 3/2012 | Jann et al. | 714/38.1 |
| 8,225,406 B1* | 7/2012 | Nachenberg | G06F 21/577 726/22 |
| 8,370,932 B2 | 2/2013 | Adams | 726/22 |
| 8,499,349 B1 | 7/2013 | Cruz et al. | 726/24 |
| 8,572,371 B2 | 10/2013 | Gassoway | 713/165 |
| 8,584,240 B1* | 11/2013 | Yang | G06F 21/552 713/188 |
| 2002/0066024 A1* | 5/2002 | Schmall | G06F 21/563 726/24 |
| 2003/0009482 A1 | 1/2003 | Benerjee et al. | |
| 2003/0159070 A1 | 8/2003 | Mayer et al. | 713/201 |
| 2004/0168070 A1 | 8/2004 | Szor | 713/188 |
| 2004/0187023 A1 | 9/2004 | Alagna et al. | 713/200 |
| 2004/0236874 A1 | 11/2004 | Largman et al. | 710/8 |
| 2005/0010804 A1* | 1/2005 | Bruening | G06F 21/52 726/1 |
| 2006/0031483 A1 | 2/2006 | Lund et al. | |
| 2006/0075468 A1 | 4/2006 | Boney et al. | 726/2 |
| 2006/0095895 A1* | 5/2006 | K | G06F 11/28 717/130 |
| 2006/0101277 A1 | 5/2006 | Meenan et al. | |
| 2006/0130141 A1 | 6/2006 | Kramer et al. | |
| 2006/0137012 A1 | 6/2006 | Aaron | |
| 2006/0206713 A1 | 9/2006 | Hickman et al. | |
| 2006/0253458 A1 | 11/2006 | Dixon et al. | 707/10 |
| 2006/0294592 A1 | 12/2006 | Polyakov et al. | |
| 2007/0006308 A1 | 1/2007 | Desouza et al. | |
| 2007/0130351 A1 | 6/2007 | Alperovitch et al. | |
| 2007/0162587 A1 | 7/2007 | Lund et al. | |
| 2007/0214151 A1 | 9/2007 | Thomas et al. | |
| 2007/0250927 A1 | 10/2007 | Naik et al. | |
| 2008/0016339 A1 | 1/2008 | Shukla | |
| 2008/0082662 A1 | 4/2008 | Dandliker et al. | |
| 2008/0091912 A1 | 4/2008 | Fleming et al. | 711/170 |
| 2008/0092235 A1* | 4/2008 | Comlekoglu | G06F 11/326 726/22 |
| 2008/0133540 A1 | 6/2008 | Hubbard et al. | |
| 2008/0178288 A1 | 7/2008 | Alperovitch et al. | |
| 2008/0183996 A1 | 7/2008 | Field et al. | 711/163 |
| 2008/0189788 A1 | 8/2008 | Bahl | |
| 2008/0209557 A1* | 8/2008 | Herley | G06F 21/565 726/23 |
| 2008/0244744 A1 | 10/2008 | Thomas et al. | |
| 2008/0244748 A1 | 10/2008 | Neystadt et al. | |
| 2009/0007100 A1 | 1/2009 | Field et al. | 718/1 |
| 2009/0044276 A1 | 2/2009 | Abdel-Aziz et al. | |
| 2009/0070878 A1 | 3/2009 | Wang et al. | |
| 2009/0077664 A1* | 3/2009 | Hsu | G06F 21/566 726/24 |
| 2009/0083852 A1 | 3/2009 | Kuo et al. | |
| 2009/0165137 A1 | 6/2009 | Yoo et al. | 726/24 |
| 2009/0187963 A1* | 7/2009 | Bori | G06F 21/51 726/1 |
| 2009/0187991 A1 | 7/2009 | Freericks et al. | |
| 2009/0222796 A1 | 9/2009 | Keohane et al. | 717/128 |
| 2009/0282476 A1* | 11/2009 | Nachenberg | G06F 21/577 726/22 |
| 2010/0058468 A1 | 3/2010 | Green et al. | |
| 2010/0077480 A1 | 3/2010 | Yoo | 726/24 |
| 2010/0107252 A1 | 4/2010 | Mertoguno | 726/23 |
| 2010/0162391 A1 | 6/2010 | Loveland et al. | 726/22 |
| 2010/0192222 A1 | 7/2010 | Stokes et al. | |
| 2010/0235647 A1 | 9/2010 | Buer | 713/187 |
| 2011/0107423 A1* | 5/2011 | Kolar Sunder | G06F 21/51 726/24 |
| 2011/0185423 A1 | 7/2011 | Sallam | |
| 2011/0185424 A1 | 7/2011 | Sallam | |
| 2011/0185428 A1 | 7/2011 | Sallam | |
| 2011/0209219 A1 | 8/2011 | Zeitlin et al. | |
| 2011/0209222 A1 | 8/2011 | Sharp et al. | |
| 2011/0265182 A1 | 10/2011 | Peinado et al. | 726/24 |
| 2012/0023583 A1 | 1/2012 | Sallam | |
| 2012/0060217 A1 | 3/2012 | Sallam | |

OTHER PUBLICATIONS

Final Office Action issued in U.S. Appl. No. 12/874,700; 17 pages, Dec. 14, 2015.
Final Office Action issued in U.S. Appl. No. 12/694,960; 26 pages, Dec. 21, 2015.
Non-Final Office Action issued in U.S. Appl. No. 14/467,668; 20 pages, Feb. 2, 2016.
Secure Computing Corporation, "TrustedSource: The Next-Generation Reputation System for Enterprise Gateway Security", pp. 1-17, 2007.
Non-Final Office Action issued in U.S. App. No. 12/874,700, 13 pages (Apr. 21, 2015).
Non-Final Office action issued in U.S. Appl. No. 12/694,960; 18 pages (Jun. 26, 2015).
Non-Final Office Action received for U.S. Appl. No. 12/695,005, mailed on Apr. 19, 2012, 23 pages.
Final Office Action Received for U.S. Appl. No. 12/695,005, mailed on Sep. 24, 2012, 23 pages.
Non-Final Office Action received for U.S. Appl. No. 12/695,005, mailed on May 15, 2013, 25 pages.
Final Office Action received for U.S Appl. No. 12/695,005, mailed on Nov. 1, 2013, 29 pages.
Notice of Allowance received for U.S. Appl. No. 12/695,005, mailed on Sep. 22, 2014, 5 pages.
Notice of Allowability received for U.S. Appl. No. 12/695,005, mailed on Nov. 6, 2014, 2 pages.
Non-Final Office Action received for U.S. Appl. No. 12/694,960, mailed on Mar. 5, 2012, 12 pages.
Non-Final Office Action received for U.S. Appl. No. 12/694,988, mailed on Apr. 18, 2012, 12 pages.
Non-Final Office Action received for U.S. Appl. No. 12/695,011, mailed on Mar. 7, 2012, 14 pages.
Non-Final Office Action received for U.S. Appl. No. 12/840,032, mailed on Jul. 6, 2012, 11 pages.

* cited by examiner

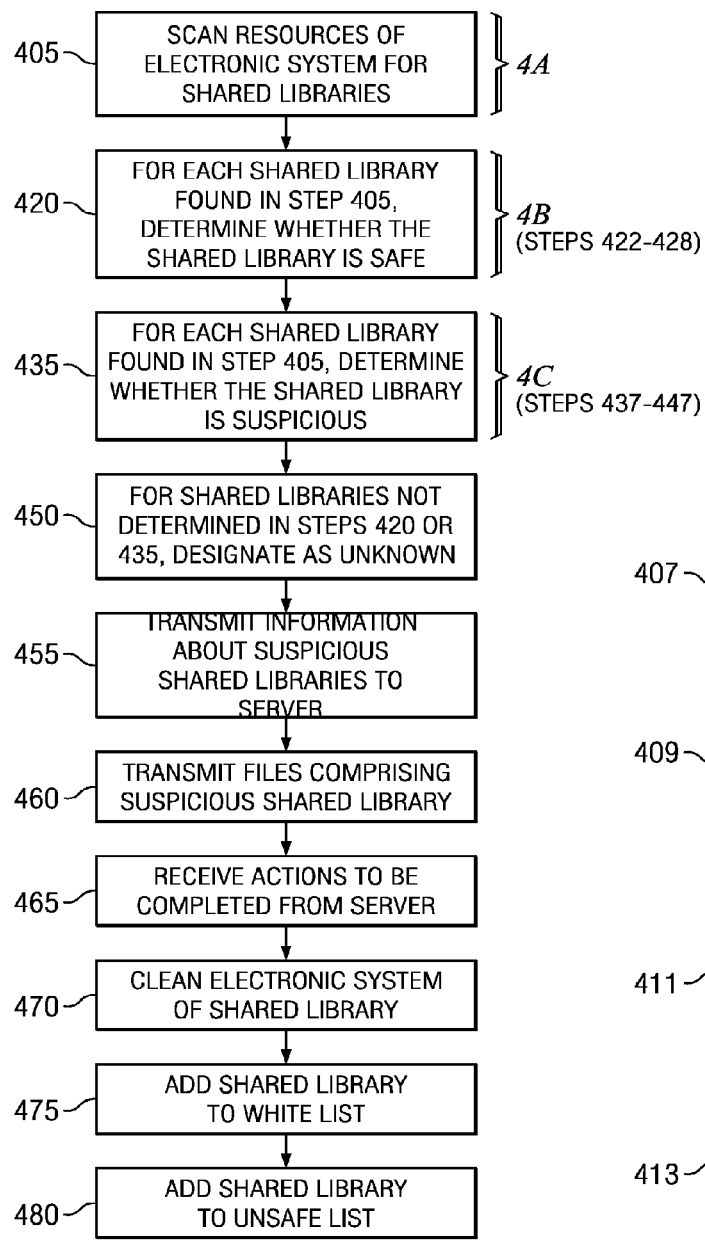
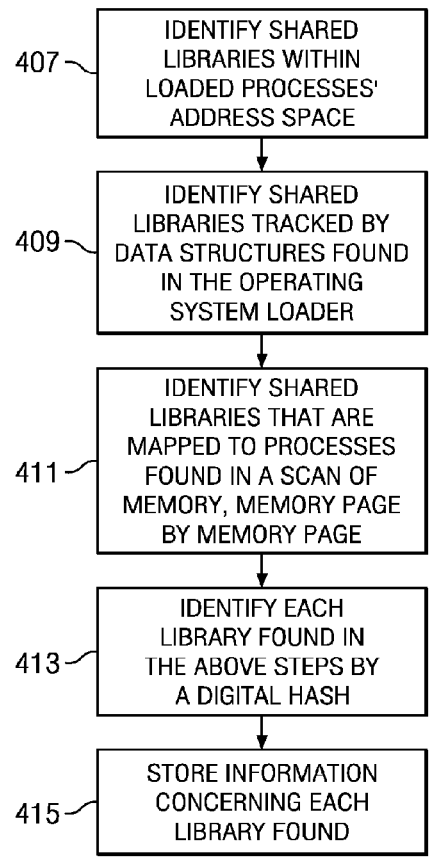
FIG. 4
FIG. 4A

METHOD AND SYSTEM FOR PROACTIVE DETECTION OF MALICIOUS SHARED LIBRARIES VIA A REMOTE REPUTATION SYSTEM

RELATED APPLICATION

This application is a Continuation of U.S. patent application Ser. No. 12/695,005 filed Jan. 27, 2010, which is hereby incorporated in its entirety by reference.

TECHNICAL FIELD OF THE INVENTION

The present invention relates generally to computer security and malware protection and, more particularly, to a method and system for proactive detection of malicious shared libraries via a remote reputation system.

BACKGROUND

Dynamic-linked-library ("DLL") injection is one of the most popular techniques used by various types of user mode computer viruses to affect computer systems. Some applications, such as Microsoft Internet Explorer and Microsoft Windows Explorer, have very open and extensible architectures to allow third parties to create extensions for the software applications. Applications are allowed to register a DLL as an application extension. However, malware may load or inject DLLs with malicious code. Loaded or injected DLLs may make changes to the application execution environment to collect user data, spy on user activities, making phishing attacks, pop up unwanted windows, or conduct other unwanted activities. Some malware, such as downloaders, inject their DLLs into a legitimate Windows process or service to hide from system administrators, end users, and anti-malware software.

SUMMARY

A method for proactively detecting shared libraries suspected of association with malware includes the steps of determining one or more shared libraries loaded on an electronic device, determining that one or more of the shared libraries include suspicious shared libraries by determining that the shared library is associated with indications that the shared library may have been maliciously injected, loaded, and/or operating on the electronic device, and identifying the suspicious shared libraries to a reputation server.

In a further embodiment, an article of manufacture includes a computer readable medium and computer-executable instructions. The computer-executable instructions are carried on the computer readable medium. The instructions are readable by a processor. The instructions, when read and executed, cause the processor to determine one or more shared libraries loaded on an electronic device, determine that one or more of the shared libraries include suspicious shared libraries by determining that the shared library is associated with indications that the shared library may have been maliciously injected, loaded, and/or operating on the electronic device, and identify the suspicious shared libraries to a reputation server.

In a further embodiment, a method of evaluating a shared library includes the steps of receiving information about a suspicious shared library, examining historical data concerning the activity of the suspicious shared library, comparing the historical data against activity representative of shared libraries associated with malware, and, based on the comparison, determining whether the suspicious shared library includes malware. The suspicious shared library is identified as possibly maliciously injected, loaded, and/or operating on an electronic device. The historical data is collected from one or more other electronic devices. The suspicious shared library is found in each of the one or more electronic devices.

In a further embodiment, an article of manufacture includes a computer readable medium and computer-executable instructions. The computer-executable instructions are carried on the computer readable medium. The instructions are readable by a processor. The instructions, when read and executed, cause the processor to receive information about a suspicious shared library, examine historical data concerning the activity of the suspicious shared library, the historical data collected from one or more other electronic devices, compare the historical data against activity representative of shared libraries associated with malware, and based on the comparison, determine whether the suspicious shared library includes malware. The suspicious shared library is identified as possibly maliciously injected, loaded, and/or operating on to an electronic system. The historical data is collected from one or more electronic systems. The suspicious shared library is found in each of the one or more electronic systems.

In a further embodiment, a system for proactive detection of shared libraries comprising malware includes a scanner and a reputation server. The scanner is configured to determine one or more shared libraries loaded on an electronic device, determine that one or more of the shared libraries include suspicious shared libraries by determining that the shared library is associated with indications that the shared library may have been maliciously injected, loaded, and/or operating on the electronic device, identify the suspicious shared libraries to a reputation server, and provide information to the reputation server about the suspicious shared libraries. The reputation server is configured to receive the information about the suspicious shared libraries, examine historical data concerning the activity of a suspicious shared library, compare the historical data against activity representative of shared libraries associated with malware, and, based on the comparison, determine that the suspicious shared library includes malware. The scanner and the reputation server are communicatively coupled. The historical data is collected from one or more electronic other devices. The suspicious shared library is found in each of the one or more electronic devices.

BRIEF DESCRIPTION OF THE DRAWINGS

For a more complete understanding of the present invention and its features and advantages, reference is now made to the following description, taken in conjunction with the accompanying drawings, in which:

FIG. 4 is an illustration of an example method to proactively detect maliciously injected and loaded shared libraries via a remote reputation system;

FIG. 4A is an illustration of an example embodiment of a step for scanning an electronic system to determine what shared libraries are loaded on the electronic system;

DETAILED DESCRIPTION

Figure 1:
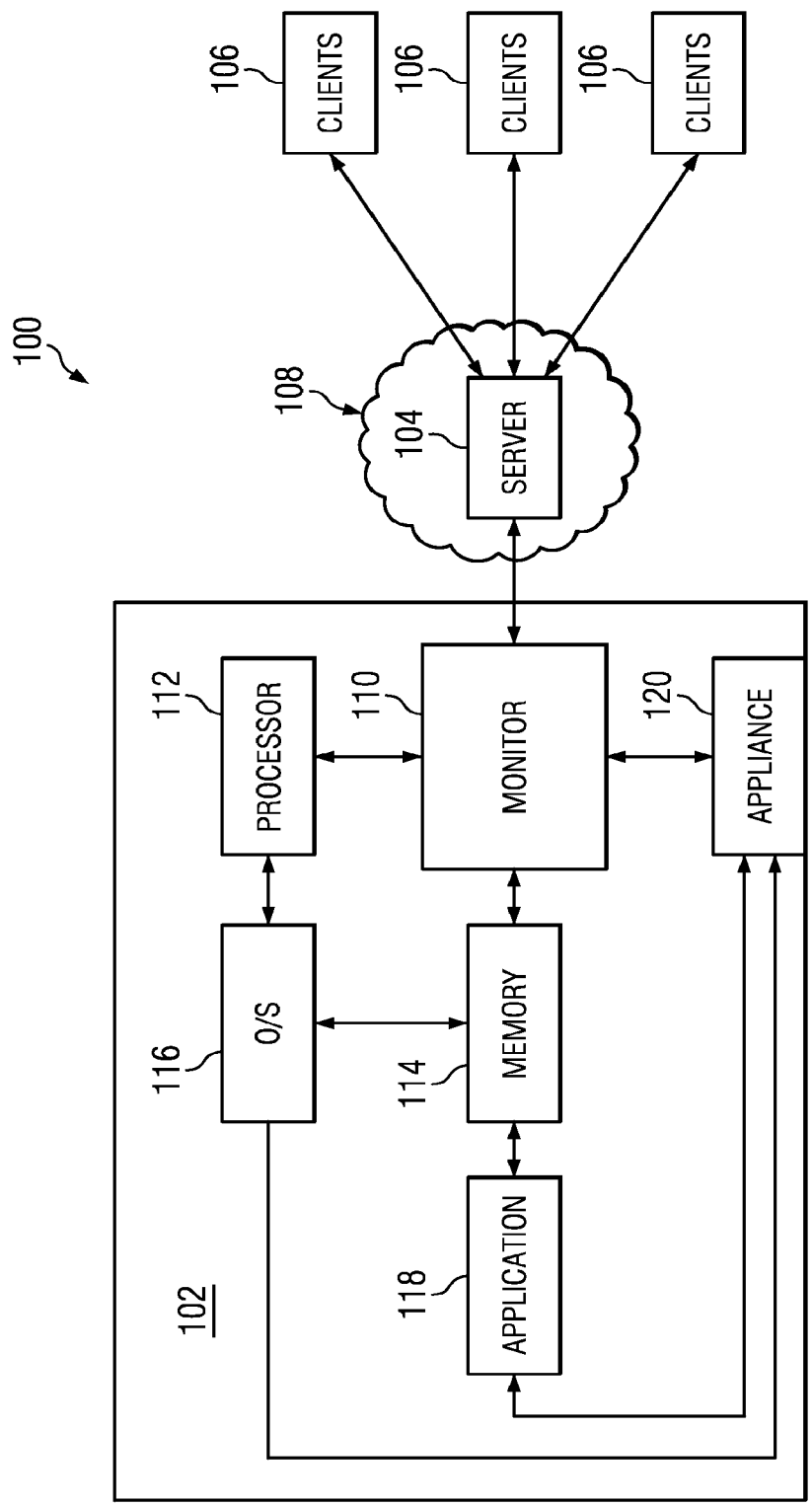
FIG. 1 is an illustration of an example system for proactive detection of malicious shared libraries via a remote reputation system.

FIG. 1 is an illustration of an example system 100 for proactive detection of malicious shared libraries via a remote reputation system. System 100 may comprise a monitor 110 and a server 104 communicating over a network 108 for monitoring an electronic device 102. Electronic device 102 may be communicatively coupled to server 104 over network 108. Similarly, one or more clients 106 may be communicatively coupled to server 104 over network 108. Monitor 110 may be configured to scan electronic device 102 for malicious shared libraries. Server 104 may be configured to gather and provide reputation information to and from electronic device 102. Server 104 may be also configured to provide reputation information to and from clients 106.

Monitor 110 may comprise an application for proactively detecting malicious shared libraries on electronic device 102. Monitor 110 may reside on electronic device 102, or on any other electronic device, server, or other suitable mechanism for proactively detecting malicious shared libraries on electronic device 102. Electronic device 102 may comprise a processor 112 coupled to a memory 114. Processor 112 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 112 may interpret and/or execute program instructions and/or process data stored in memory 114. Memory 114 may be configured in part or whole as application memory, system memory, or both. Memory 114 may include any system, device, or apparatus configured to hold and/or house one or more memory modules. Each memory module may include any system, device or apparatus configured to retain program instructions and/or data for a period of time (e.g., computer-readable media).

In one embodiment, monitor 110 may reside in a memory such as memory 114, and be executed by a processor such as processor 103 by instructions contained in a memory such as memory 114. In another embodiment, monitor 110 may operate on an electronic device separate from electronic device 102, such as a server connected to electronic device 102 over a network. In such an embodiment, monitor 110 may reside in a memory other than memory 114, and be executed by a processor other than processor 103. In such an embodiment, monitor 110 may be stored in an executed by resources in the server. In one embodiment, monitor 110 may be configured to operate in a cloud computing scheme.

An operating system 116 may reside on electronic device 102. Operating system 116 may be stored in memory 104 and executed by processor 112 with instructions stored in memory 114. Operating system 116 may be configured to conduct any tasks conducted by operating systems for electronic device 102, including but not limited to execution and memory management. In particular embodiments, operating system 116 may comprise a Windows operating system, an embedded operating system, a Linux operating system, or a Macintosh operating system. However, any suitable operating system may be used.

An application 118 may reside on electronic device 102. Application 118 may be stored in memory 114 and executed by processor 112 with instructions stored in memory 114. Application 118 may be configured to conduct any tasks known to be conducted by applications on electronic device 102. Application 118 may comprise an end-user application, a device driver, a run-time engine, an object file, a functional library, a segment of code, or any other compiled or uncompiled data for operation upon electronic device 112.

An appliance 120 may reside on electronic device 102. Appliance 120 may be a virtual or actual device, and may be configured to, among other things, facilitate use of electronic device 102 with a user, another electronic device, or a network. In one embodiment, appliance 120 may comprise a network port for communication between electronic device 102 and a network. In one embodiment, appliance 120 may comprise a firewall configured to protect electronic device 102 from attacks on the internet. Operating system 116 and/or application 116 may be coupled or connected to appliance 120, and accordingly use appliance 120 to accomplish tasks.

Monitor 110 may be configured to detect maliciously injected and loaded shared libraries on electronic device 102. In one embodiment, the maliciously injected and loaded shared libraries comprise dynamic-linked-libraries (DLL's). Monitor 110 may be configured to determine what shared libraries may be loaded onto electronic device 102. Monitor 110 may use any suitable techniques to determine the shared libraries that are loaded onto electronic device 102. Many different techniques may be possible to determine an estimation of the shared libraries loaded on electronic device 102. However, many instances of malware may be designed to defeat detection by one or more of these methods, or a particular method may be insufficient to discover all relevant shared libraries.

In one embodiment, monitor 110 may be configured to employ a low level technical function provided by the processing kernel of operating system 116 to identify all existing modules inside any address space of a process running on operating system 116, of which the operating system 116 is cognizant. However, in such an embodiment, a malicious shared library may not be associated with a process known to the operating system 116.

In one embodiment, monitor 110 may be configured to access the operating system loader of operating system 116 to enumerate the actual data structures used to keep track of libraries within a given process address space. The actual data structures may be parsed to identify additional shared libraries.

In one embodiment, monitor 110 may be configured to scan memory 114 memory page by memory page to identify any mapping of any process to a shared library.

Figure 2:
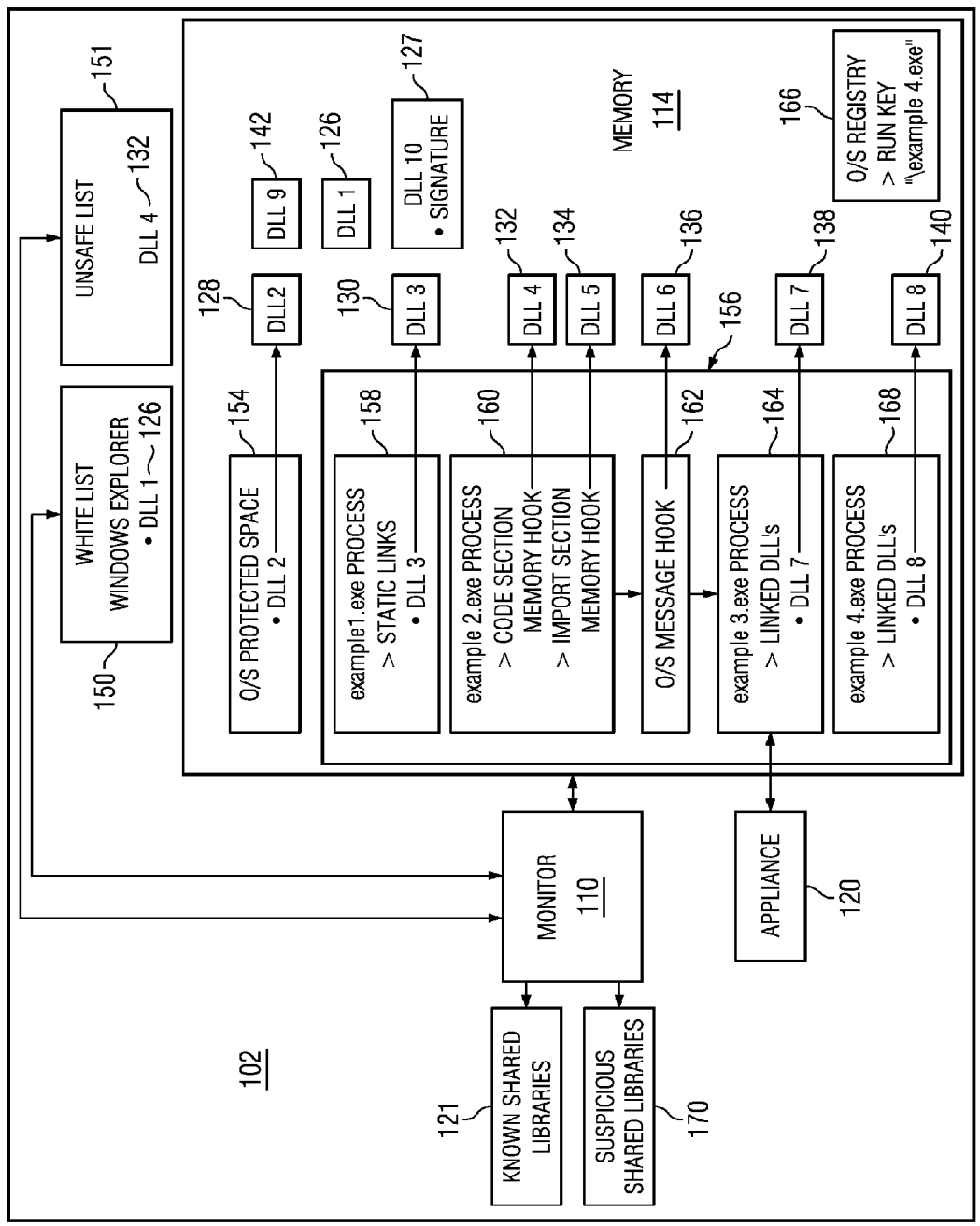
FIG. 2 is an illustration of a list of known shared libraries that contains shared libraries that have been determined as loaded onto electronic device.

FIG. 2 is a more detailed view of electronic device 102. A list of known shared libraries 121 may comprise a list of shared libraries that have been determined as loaded onto electronic device 102. Monitor 110 may be configured to create list of known shared libraries 121 through the processes described above. List of known shared libraries 121 may comprise one or more entries, each for a shared library which has been determined as loaded onto electronic device 102. The entries representing shared libraries in list of known shared libraries may be identified by a unique identifier. In one embodiment, shared libraries may be identified by a name. In another embodiment, shared libraries may be identified by a digital signature. In yet another embodiment, shared libraries may be identified by a digital hash of the library. Monitor 110 may be configured to determine the digital signature or digital hash of a given shared library. The entries may comprise additional information suitable to be used by monitor 110 to determine whether the shared library is suspicious. For example, the entries may comprise a field for processes associated with the shared library.

Monitor 110 may be configured to analyze the entries in list of known shared libraries 121 to determine which shared libraries are suspicious. In one embodiment, monitor 110 may be configured to complete the discovery of shared libraries before engaging in the suspicion analysis. In one embodiment, monitor 110 may be configured to engage in suspicion analysis as shared libraries are discovered by the above processes. In such an embodiment, actual construction of list of known shared libraries may be unnecessary. List of known shared libraries 121 may comprise a record, database, or any other data structure suitable to store sufficient information concerning a shared library such that monitor 110 may determine whether the shared library may be suspicious.

Monitor 110 may be configured to employ any suitable method to analyze entries in list of known shared libraries 121 to determine whether the entries are suspected of malware. Monitor 110 may be configured to employ methods to determine that a particular shared library is safe, and does not comprise malware.

For example, in one embodiment, monitor 110 may be configured to use a per-process "white list" of accepted shared libraries to exclude a given shared library from suspicion as malware, wherein the white list may comprise authorized shared libraries loaded by default by a given process. For example, a white list 150 may contain the shared libraries that are by default loaded inside the application known as Windows Explorer, including DLL1 126. A shared library that is associated with the process for Windows Explorer may thus be excluded from suspicion.

In one embodiment, monitor 110 may be configured to exclude from suspicion any shared libraries that have been digitally signed. A shared library that has been digitally signed upon its creation may be traced to the signor and, presumably, creator. A shared library that has been digitally signed may be less likely to comprise malware than one that has not been digitally signed. In such an embodiment, monitor 110 may be configured to exclude such a digitally signed shared library from suspicion. In further embodiment, the digital signor may appear on a signor white list, wherein the signor white list comprises identities of known, safe signors of shared libraries and other system executable objects. In such an embodiment, monitor 110 may be configured to exclude such a shared library, digitally signed by a signor appearing on a signor white list, from suspicion.

In one embodiment, monitor 110 may be configured to exclude from suspicion as malware any shared libraries that are protected by the operating system. A shared library that is protected by the operating system is not likely to have been infected with malware. For example, DLL2 128 resides in an address space protected by the operating system 154. In one embodiment, any shared library protected by the Windows system file protection scheme will be excluded from suspicion as malware.

In one embodiment, monitor 110 may be configured to exclude from suspicion as malware any shared libraries that are statically linked to a process's main executable, or any other shared libraries statically linked in turn to these shared libraries. For example, DLL3 130 may be statically linked to the main process executable for "example1.exe" and thus be excluded from suspicion.

Monitor 110 may be configured to employ methods to determine that a particular shared library in the list of known shared libraries 121 specifically constitutes a suspicious shared library.

For example, monitor 110 may be configured to examine process memory 156 looking for changes that point to a given shared library. The suspected change may be contained in the information field associated with the shared library in list of known shared libraries 121. In one embodiment, an inline hook in the code section of a process may point to a shared library. For example, the "example2.exe" process may contain a code section hook that points to DLL4 132. In one embodiment, a hook in the import or export sections of a process may point to a shared library. For example, the "example2.exe" process may contain an import section hook that points to DLL5 134. In one embodiment, a hook in an operating system message, which may be used to share information between processes, may point to a shared library. For example, a memory hook 162 may intercept a message sent from the process "example2.exe" 160 to the process "example3.exe," 163 and the hook may point to DLL6 136. In a further embodiment, a hook in a registered Windows message may point to a shared library. In one embodiment, an open "listen" port on an appliance 120, or in the memory associated with appliance 120, may point to a shared library. In all such embodiments, the shared library which has been pointed to or otherwise identified may comprise a shared library that has been maliciously injected or loaded onto electronic device 102. For example, the process "example3.exe" 164 may be listening on a port of appliance 120, which may comprise a network port. "Example 3.exe" is linked to a shared library DLL7 138.

Monitor 110 may be configured to examine shared libraries in the list of known shared libraries 121 to determine whether a shared library is linked to a suspicious executable registry entry. For example, operating system 116 may comprise a registry 166. The registry may contain keys, or entries, in which an execution path may reference an executable. Malware may use this structure to trick a system into running a malicious executable. The executable and its associated shared libraries may not yet be specifically known as malware. A shared library linked to such an executable may be determined by monitor 110 to be suspicious. For example, registry 166 may comprise a "Run" key, with a path "\example4.exe," causing the process example4.exe 168 to run. All shared libraries associated with example4.exe, such as DLL8 170, may be determined to be suspicious.

As a result of examining the shared libraries in the list of known shared libraries 121 to determine what entries may be suspicious, monitor 110 may be configured to summarize the results in a list of suspicious shared libraries 170. List of suspicious shared libraries 170 may comprise a subset of list of known shared libraries 121. In one embodiment, list of suspicious shared libraries 170 may comprise a data field or other designation in list of suspicious shared libraries 170. List of suspicious shared libraries 170 may be implemented in any way suitable to denote the shared libraries present on electronic device 102 that monitor has found to be suspicious, including but not limited to a list, data structure, record, database, or file. List of suspicious shared libraries may include an identifier for each shared library, wherein the identifier may comprise a name, signature, or digital hash. List of suspicious shared libraries may include an information field for each shared library, containing information relevant to the shared library's suspected malicious nature, including but not limited to identification of the electronic device 102, associated processes, files, executables, registry entries, network ports, hooks, addresses, or memory spaces. In one embodiment, list of suspicious shared libraries may include a copy of the shared library itself.

Some entries in list of known shared libraries 121 may not have been specifically excluded as suspicious, nor specifically identified as suspicious. Monitor 110 may be configured to identify such entries as unknown. For example, DLL9 142 has an unknown status. In one embodiment, monitor may be configured to designate such entries as unknown in the list of known shared libraries 121. In one embodiment, monitor 110 may be configured to add such entries to list of suspicious shared libraries 170. In such an embodiment, monitor 110 may be configured to designate such entries as unknown in the list of suspicious shared libraries 170. In one embodiment, monitor 110 may be configured to treat such entries as equivalent to a suspicious entry.

Monitor 110, or another suitable application, may be configured to apply anti-malware techniques to rid electronic device 102 of known malware, and of known indications of malware. Such techniques may include, but are not limited to, anti-virus heuristics, anti-adware, anti-rootkit, or anti-spyware techniques. Monitor 110 or another suitable application may be configured to apply such techniques at any suitable time, including before monitor 110 determines list of suspicious shared libraries 170. Monitor 110 or another suitable application may be configured to subsequently clean electronic device 102 of the identified malware. Monitor 110 may be configured to remove known malware from list of suspicious shared libraries 170 as the malware is cleaned.

Figure 3:
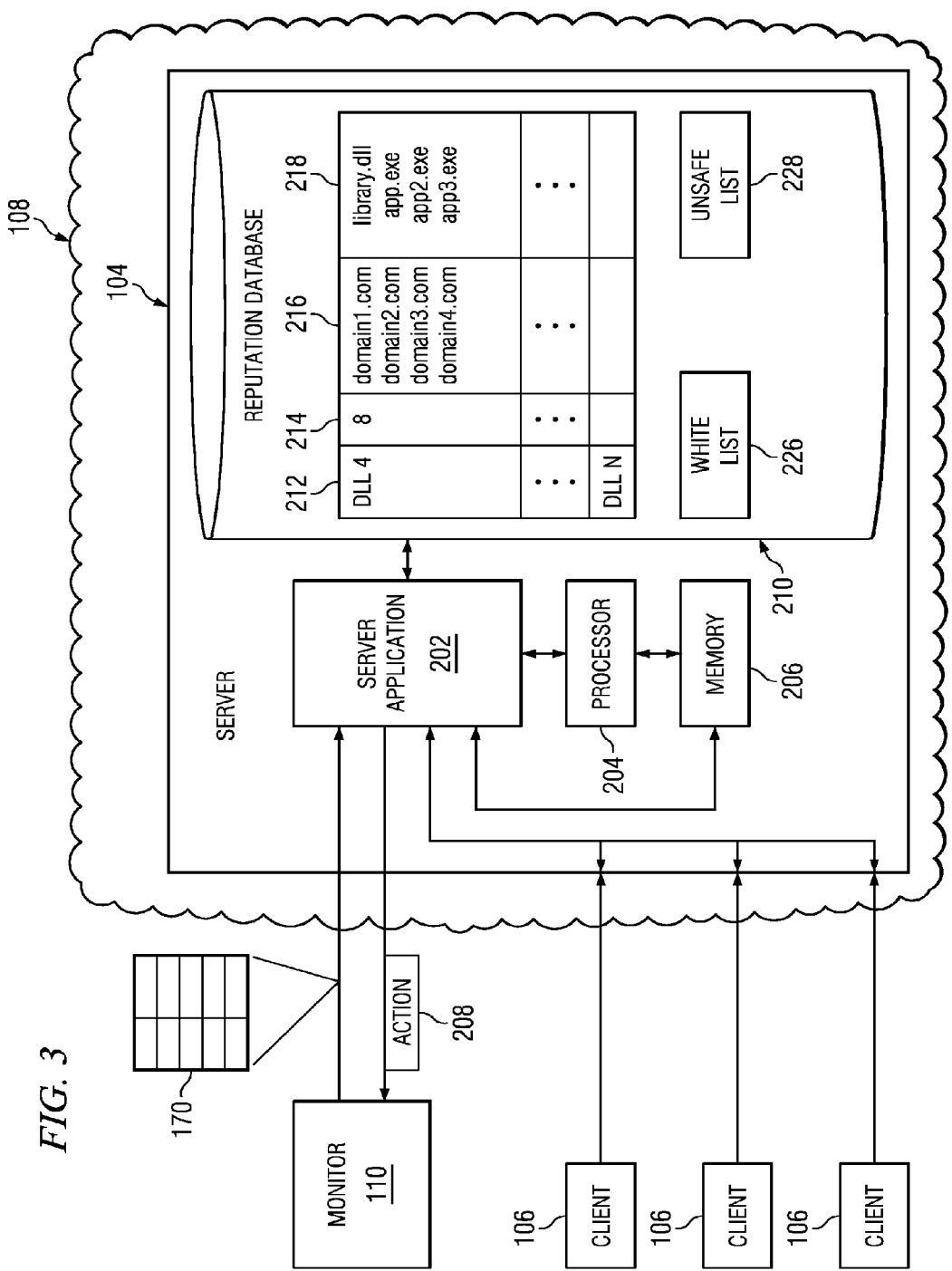
FIG. 3 is an illustration of an example server for receiving information about suspicious shared libraries, evaluating the nature of the suspicious shared libraries, and sending actions in response.

Monitor 110 may be configured to transmit list of suspicious shared libraries 170 to server 104. FIG. 3 is an illustration of an example server 104 for receiving information about suspicious shared libraries, evaluating the nature of the suspicious shared libraries, and sending actions in response. Server 104 may comprise a processor 204 coupled to a memory 206. A server application 202 and/or a reputation database 210 may reside on server 104. Server 104 may comprise a reputation server.

Server 104 may be configured to receive list of suspicious shared libraries 170 from monitor 110. In one embodiment, server application 104 may receive list of suspicious shared libraries 170 from monitor 110. Likewise, server 104 may be configured to receive information from any number of clients 106. Each of clients 106 may reside on or be communicatively coupled to one or more electronic devices (not shown). Each of clients 106 may be configured to determine suspicious shared libraries on the one or more electronic devices on which the clients 106 reside on or are communicatively coupled. Each of clients 106 may be configured to transmit information about suspicious shared libraries to server 104.

Server 104 may be implemented by one or more machines or electronic devices, running one or more instances of server application 202. In one embodiment, server 104 may be implemented on a single machine, on which resides on server application 202. Server application 202 may be stored in memory 206, and configured to be executed by processor 204 with instructions in memory 206. Processor 204 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 204 may interpret and/or execute program instructions and/or process data stored in memory 206. Memory 206 may be configured in part or whole as application memory, system memory, or both. Memory 206 may include any system, device, or apparatus configured to hold and/or house one or more memory modules. Each memory module may include any system, device or apparatus configured to retain program instructions and/or data for a period of time (e.g., computer-readable media).

Server application 202 may be configured to receive list of suspicious shared libraries 170 from monitor 110. In one embodiment, server application 202 may be configured to receive similar lists from clients 106. Server application 202 may be configured to determine whether one or more shared libraries in list of suspicious shared libraries 170 comprise malware. Server application 202 may be configured to return an action 208 to monitor 110 containing instructions as to how to handle one or more shared libraries. In one embodiment, server application may be similarly configured to return an action 208 to clients 106.

Server application 202 may be configured to utilize reputation database 210 to decide what action 208 to return to monitor 110. Reputation database 210 may be configured to store information about shared libraries concerning a shared library's possible association with malware. Reputation database 210 may be implemented in any suitable way to adequately provide information to server application 110 concerning the nature of a shared library in regards to malware, including but not limited to: a database, file, record, server, functional library, or module.

Reputation database 210 may comprise a white list 226 of safe shared libraries. Reputation database 210 may also comprise an unsafe list 228 of shared libraries, which may comprise shared libraries with confirmed association with malware. Reputation database 210 may also comprise information about shared libraries that appears in neither a white list nor unsafe list.

Server application 202 may be configured to populate reputation database 210 with information received such as that contained within list of suspicious shared libraries 170. Reputation database 210 may comprise additional information fields 212-218, for a given shared library, including but not limited to: a unique identifier 212; how many times the library has been reported as suspicious 214; each internet address or domain from which it was reported 216; and/or each of the processes, executables, shared libraries, or other system executable objects associated with the suspicious shared library 21. Reputation database 210 may also include a copy of the shared library itself and the circumstances under which it was reported. Unique identifier 212 may comprise a digital signature or hash of the shared library. Information fields 212-218 may each be implemented with any structure suitable to store and make accessible the information contained within the field. One or more information fields may indicate whether the shared library is on white list 226 or unsafe list 228.

Server application 202 may be configured to determine, based on the contents of reputation database 210 and list of suspicious shared libraries 170, whether a given shared library comprises malware or not.

In one embodiment, server application 202 may be configured to determine whether a shared library from list of suspicious shared libraries 170 is on white list 226. In such an embodiment, server application 202 may determine that a shared library on white list 226 does not constitute malware, and thus may send an action 208 to monitor 110 with instructions to do nothing to the shared library. In one embodiment, server application 202 may send, as part of action 208, white list 226 to monitor 110, or an instruction for monitor 110 to add the shared library to the white list 150 of monitor 110. Monitor 110 may be configured to allow such a shared library to continue to operate. Monitor 110 may be configured to add the identity of such a shared library to its white list 150.

In one embodiment, server application 202 may be configured to determine whether a shared library from list of suspicious shared libraries 170 is on unsafe list 228. In such an embodiment, server application 202 may determine that a shared library on unsafe list 228 does not constitute malware, and thus may send an action 208 to monitor 110 with instructions to clean the shared library from electronic device 102. In one embodiment, server application 202 may send, as part of action 208, unsafe list 226 to monitor 110, or an instruction for monitor 110 to add the shared library to the unsafe list 151 of monitor 110. Monitor 110 may be configured to allow such a shared library to continue to operate. Monitor 110 may be configured to add the identity of such a shared library to its white list 150.

Some shared libraries analyzed by server application 202 may be contained in neither white list 226 nor unsafe list 228. Information about such undetermined shared libraries in list of suspicious shared libraries 170 may be populated in reputation database 210 by server application 202. Such undetermined shared libraries may represent new shared libraries, software, or other system executable objects that have not yet been determined by traditional anti-malware methods to be malware, or conversely, malware. Some malware may not produce an easily identifiable shared library that can be tagged as malware by traditional anti-malware methods. There may be a lag between the introduction of new malware, or a new mutation of malware, and the ability of traditional anti-malware methods to tag all related system executable objects as malware. Though definitive information may be unavailable about a particular shared library, or the true identity of the applications associated with the shared library is unknown, embodiments of the present invention contemplate methods of detecting as malware shared libraries for which relatively little is known.

In addition to populating reputation database 210, server application 202 may be configured to access reputation database 210 to obtain known information about a given shared library. Server application 202 may be configured to determine from information fields 212-218 whether there is sufficient evidence to consider an undetermined shared library as malware, neither, or as safe. Server application 202 may be configured to subsequently send action 208 to monitor 110 with instructions to clean electronic device 102 of the shared library. Server application 202 may be configured to include in action 208 a designation that a shared library comprises malware. Monitor 110 may interpret such an action 208 according to a predetermined set of instructions. Server application 202 may be configured to include in action 208 a designation that a shared library is safe and does not comprise malware. Monitor 110 may likewise interpret such an action 208 according to a predetermined set of instructions.

Server application 202 may be configured to include in action 208 with instructions for monitor 110 to add a shared library comprising malware to the unsafe list 151 of monitor 110. In the case of a safe shared library, to add the shared library to the white list 150 of monitor 110. In cases where not enough information is yet known about the shared library, server application 202 may be configured to simply populate reputation database 210 with information about the shared library, and return no instructions in action 208 to monitor 110. Server application 202 may be configured to populate reputation database 210 with an indication of whether or not a shared library has been newly determined to comprise malware. Such indications may be stored in an additional information field in the reputation database 210 or in the white list 226 or unsafe list 228.

Server application 202 may be configured to utilize any suitable criteria to determine that a particular shared library comprises malware. Server application 202 may, for example, take into account the number of times a shared library has been reported, the number or the identity of the addresses that have reported the shared library, the number or identity of different system executable objects the shared library has been associated with, or the particular behavior of the shared library. In one embodiment, server application 202 may be configured to request the file containing the shared library itself from monitor 110. In such an embodiment, server application 202 may be configured to scan the shared library for malware. Server application 202 may be configured to store the file containing the shared library in an information field of reputation database 210.

In one embodiment, server application 202 may be configured to analyze information 212-218 indicating that a particular shared library has been installed on thousands of machines on thousands of domains in a short amount of time. In such an embodiment, server application 202 may be configured to determine that such a shared library does not comprise malware. The detection of large numbers of an undetermined shared library, from many different servers, that has not already been determined to be malware (and thus possibly appear in unsafe list 228), may indicate that the shared library is part of a new software release from an innocent source.

In one embodiment, server application 202 may be configured to analyze information 212-218 indicating that a particular shared library has been installed on different machines from the same domain. In such an embodiment, server application 202 may be configured to determine that such a shared library does not comprise malware. The detection of multiple instances of an undetermined shared library from a single domain, network, or group of machines may indicate that particular homespun software may have been locally released. For example, a system administrator for a corporation may have developed a utility comprising memory hooks to a shared library he created, for some legitimate purpose among the users of the corporation intranet. Such a shared library may not likely be reported to the larger community, and thus may be undetermined. However, its use may likely be contained to a local set of computing resources, in contrast to malware, which may spread to many different domains.

In one embodiment, server application 202 may be configured to analyze information 212-218 indicating that a particular shared library may be linked to many different applications, or to no applications at all. In such an embodiment, server application 202 may be configured to determine that such a shared library comprises malware. Most legitimate shared libraries that may link to a large number of system executable objects may be known, and thus may appear on white list 226. An undetermined shared library that is associated with many system executable objects may indicate that the shared library is malware that attacks various applications, or may be morphing. A shared library that does not associated with any particular application may be malware, since the shared library has perhaps attempted to disguise its nature by operating outside the scope of specific processes or applications.

In one embodiment, server application 202 may be configured to analyze information 212-218 indicating that a particular shared library may be pointed to by memory hooks in several different system executable objects. In such an embodiment, server application 202 may be configured to determine that such a shared library comprises malware. Many hooks in memory caused by legitimate modifications point to shared libraries that may be known to be safe, such as those in white list 226. The presence of a memory hook or similar modification, especially in more than one system executable object, pointing to an undetermined shared library may indicate that the shared library comprises malware.

In one embodiment, server application 202 may be configured to analyze information 212-218 indicating that a particular undetermined shared library has been encountered a relatively few number of times, but on a wide number of different domains, or groups of internet addresses. In such an embodiment, server application 202 may be configured to determine that such a shared library comprises malware. For example, reputation database 210 may indicate that an undetermined library has been found in a number of different machines on different domains over a relatively long period of time, such as several days, but that the total number of instances is relatively low, such as eight. Such an undetermined shared library may comprise malware, since its behavior is suspicious. An innocent shared library with such a wide distribution may likely have many more instances than eight over several days' time. Server application 202 may be further configured to make such a determination when such analysis with is combined other analyses, such as those described above. For example, server application 202 may be configured determine as malware a first found instance of a memory hook in a critical system executable object that points to an undetermined shared library.

Monitor 110 may be configured to receive action 208 with instructions with regards to the entries in list of suspicious shared libraries 170. Action 208 may contain instructions for none, one, or more than one of the entries in list of suspicious shared libraries 170. Action 208 may comprise instructions to clean electronic device of a particular shared library. Monitor 110 may be configured to clean electronic device 102 in any suitable fashion so as to rid electronic device of the presence and effects of a shared library comprising malware. For example, monitor 110 may: undo modifications made in relation to the shared library; delete the shared library; repair related infections in memory; quarantine the shared libraries; conduct these or similar activities on other system objects related to the shared library. Malware may be configured to add entries to white list 150 or unsafe list 151.

In operation, monitor 110 may be running on electronic device 102, or another machine, server, or device, to monitor the status of electronic device 102. Operating system 116 and/or one or more applications 118 may be running on electronic device 102, and may be interacting with appliance 120. Operating system 116 and/or one or more applications 118 may be loaded into memory 114, and executed by processor 112 with instructions contained in memory 114. Monitor 110 may be loaded in the memory 114 of electronic device 102, and be executed by processor 112 with instructions contained within memory 114. Monitor 110 may be executed through a cloud computing scheme, wherein monitor 110 resides and executes on a server connected to electronic device through network 108, while monitoring electronic device 102.

Monitor 110 may detect maliciously injected and loaded shared libraries on electronic device 102. Monitor 110 may determine what shared libraries are loaded onto electronic device 102 through any suitable techniques of determining the presence of shared libraries. Monitor 110 may employ functions provided by the processing kernel of operating system 116 to identify all existing modules inside any address space of a process running on operating system 116. Monitor 110 may access the operating system loader of operating system 116 to enumerate the actual data structures used to track shared libraries within a process's address space. Monitor 110 may scan memory 114 memory page by memory page to identify any mapping of a process to a shared library.

Monitor 110 may determine one or more shared libraries that are present on electronic device 102, and compile the results in a list of known shared libraries 121. Monitor 110 may store a digital hash of each shared library as well as other information associated with the shared library.

Monitor 110 may determine which entries in list of known shared libraries 121 are suspicious, indicating a possible infection of malware, which entries are safe, and which entries whose status is unknown. Monitor 110 may store the results of determining suspicious shared libraries in list of suspicious libraries 170. Monitor 110 may utilize any suitable method to determine the status of a shared library. Monitor 110 may employ methods to determine that a particular shared library in the list of known shared libraries 121 specifically constitutes a safe shared library.

Monitor 110 may use a white list 150 to determine that a shared library does not comprise malware, and is thus not suspicious. For example, DLL1 126 appears in white list 150 as associated with the known process 'Windows Explorer,' and as such monitor 110 may not place DLL1 126 in list of suspicious shared libraries 170. Monitor 110 may exclude from suspicion shared libraries that are digitally signed. For example, DLL10 127 contains a digital signature, and as such monitor 110 may not place DLL10 127 in list of suspicious shared libraries 170. Monitor 110 may exclude from suspicion shared libraries that are protected by the operating system. For example, DLL2 128 resides in the operating system protected space 154, and as such monitor 110 may not place DLL2 128 in list of suspicious shared libraries 170. Monitor 110 may exclude from suspicion shared libraries that are statically linked to a process's main executable, or any other shared libraries statically linked in turn to these shared libraries. For example, DLL3 130 may be statically linked to the main process executable for "example1.exe" 158, and as such monitor 110 may not place DLL3 130 in list of suspicious shared libraries 170.

Monitor 110 may employ methods to determine that a particular shared library in the list of known shared libraries 121 specifically constitutes a suspicious shared library. Monitor 110 may place a shared library determined to be suspicious in list of suspicious shared libraries 170, along with any other information 172 useful for determining the nature of the shared library.

Monitor 110 may use an unsafe list 151 to determine that a shared library comprises malware. Monitor 110 may optionally clean electronic device 102 of a shared library that appears in unsafe list 151. Monitor 150 may optionally designate as suspicious a shared library that appears in unsafe list 151. For example, DLL4 132 may appear in unsafe list 151, and as such monitor 110 may place DLL4 132 in list of suspicious shared libraries 170. Monitor 110 may examine process memory 156 looking for changes that point to a given shared library. Monitor 110 may search for an inline memory hook in a process points to a shared library. For example, "example2.exe" process 160 may contain a memory hook in its code section pointing to DLL4 132, and as such monitor 110 may place DLL4 132 in list of suspicious shared libraries 170. For example, "example2.exe" process 160 may contain a memory hook in its import or output section pointing to DLL5 134, and as such monitor 110 may place DLL5 134 in list of suspicious shared libraries 170. Monitor 110 may search for a hook in an operating system message. For example, O/S message hook 162 may intercept a message between the process "example2.exe" 160 and the process "example3.exe" 162, the memory hook may point to DLL6 136, and as such monitor 110 may place DLL6 136 in list of suspicious shared libraries 170. Monitor 110 may search for shared libraries listening to open network ports, or for shared libraries linked to processes that are listening to open network ports. For example, "example3.exe" process 164 is listening to an open port on appliance 120, is linked to DLL7 138, and as such monitor 110 may place DLL7 138 in list of suspicious shared libraries 170. Monitor 110 may search for shared libraries linked to suspicious executable registry entries. For example, O/S registry 166 may comprise a "RUN" key with a path to execute the process "example4.exe" 168, process "example4.exe" 168 may in turn be linked to DLL8 140, and as such monitor 110 may place DLL8 140 in list of suspicious shared libraries 170.

Monitor 110 may classify entries in list of known shared libraries 121, which have not been specifically classified as safe or suspicious, as unknown. For example, DLL9 142 may be classified as unknown. Monitor 110 may include entries with unknown status in list of suspicious shared libraries 170.

Monitor 110 may transmit list of suspicious shared libraries 170 to server 104, and to server application 202.

Server application 202 may be running on electronic server 104, or another machine, server, or device. Server application 202 may be loaded in the memory 206 of server 104, and be executed by processor 204 with instructions contained within memory 206. Server application 202 may be executed through a cloud computing scheme, wherein server application 202 resides and executes on a server such as server 104, connected to monitor 110 through network 108. In one embodiment, server application 202 and monitor 110 may be running on the same server, network of servers, or other hardware configuration, providing monitoring service of electronic device 102.

Server application 202 may provide an action 208 to monitor 110, the action 208 comprising a designation of the status of a shared library. Action 208 may comprise instructions of how to handle shared libraries described in list of suspicious shared libraries 170 to server. Server application 202 may similarly receive information about shared libraries from other clients 106, and similarly provide actions to clients 106.

Server application 202 may determine whether an entry in list of suspicious shared libraries 170 comprises malware. If a shared library in list of suspicious shared libraries 170 is determined by server application 202 to specifically not comprise malware, server application 202 may instruct monitor 110 to do nothing with regards to the shared library. If a shared library in list of suspicious shared libraries 170 is determined by server application 202 to specifically not comprise malware, server application 202 may instruct monitor 110 to add shared library to the white list 150. If a shared library in list of suspicious shared libraries 170 is determined by server application 202 to specifically comprise malware, server application 202 may instruct monitor 110 to clean electronic device 102 of the shared library. If a shared library in list of suspicious shared libraries 170 is determined by server application 202 to specifically comprise malware, server application 202 may instruct monitor 110 to add shared library to unsafe list 151.

Server application 202 may populate reputation database 210 with information contained within list of suspicious shared libraries 170. Server application 202 may access reputation database 210 to determine whether a given shared library comprises malware or not, and what action 208 to instruct monitor 110 to take. Server application 202 may use any suitable criteria to determine whether a shared library in suspicious shared libraries comprises malware or not. Server application 202 may request additional information from monitor 115, including the shared library itself. Server application 202 may scan the shared library itself to determine whether the shared library comprises malware.

Server application 202 may access white list 226 of shared libraries; if a shared library is found in white list 226, then server application 202 may determine that the shared library is safe and does not comprise malware. Server application 202 may access unsafe list 228 of shared libraries; if a shared library is found in unsafe list 228, then server application 202 may determine that the shared library is unsafe and comprises malware.

Server application 202 may utilize any suitable criteria to determine whether information from reputation database 210 shows that an undetermined shared library comprises malware or not.

Server application 202 may take into account the number of times a shared library has been reported, the number or the identity of the addresses that have reported the shared library, the number or identity of different system executable objects the shared library has been associated with, or the particular behavior of the shared library. In one embodiment, server application 202 may analyze information 212-218 indicating that a particular shared library has been installed on thousands of machines on thousands of domains in a short amount of time. In such an embodiment, server application may determine that the shared library does not comprise malware. In one embodiment, server application 202 may analyze information 212-218 indicating that a particular shared library has been installed on different machines from the same domain. In such an embodiment, server application may determine that the shared library does not comprise malware. Any suitable threshold of installations in a given time frame or on a given number of domains may be selected, corresponding to a distribution pattern of a safe shared library.

In one embodiment, server application 202 may analyze information 212-218 indicating that a particular shared library may be linked to many different applications, or to no applications at all. In such an embodiment, server application 202 may be configured to determine that such a shared library comprises malware. In one embodiment, server application 202 may analyze information 212-218 indicating that a particular shared library may be pointed to by memory hooks. In such an embodiment, server application 202 may be configured to determine that such a shared library comprises malware. In one embodiment, server application 202 may be configured to analyze information 212-218 indicating that a particular undetermined shared library has been encountered a relatively few number of times, but on a wide number of different domains, or groups of internet addresses. In such an embodiment, server application 202 may be configured to determine that such a shared library comprises malware. Any suitable threshold of installations in a given time frame or on a given number of domains may be selected, corresponding to a distribution pattern of a shared library comprising malware. Server application 202 analyzes information 212-218 utilizing two or more of the techniques described above in combination.

Server application 202 may adjust or update any information field 212-218 as a result of conducting its analysis. New data from list of suspicious shared libraries 170 may be added to reputation database 210. Server application 202 may designate as such a shared library determined to not comprise malware, in a status information field of reputation database 210. Server application 202 may designate as such a shared library determined to comprise malware, in a status information field of reputation database 210. In one embodiment, server application may make such designations by updating the contents of white list 226 or unsafe list 228.

Server application 202 may send action 208 to monitor 110. Monitor 110 may interpret action 208 to, for example: clean the system of a malware-related shared library; add a safe shared library to white list 150; add a malware-related shared library to unsafe list 151; send additional information; or do nothing in regards to a particular shared library. Monitor may carry out instructions contained in action 208. Monitor may carry out a predefined plan based on information, such as the status of a shared library, contained within action 208.

FIG. 4 is an illustration of an example method 400 to proactively detect maliciously injected and loaded shared libraries via a remote reputation system. In step 405, the resources of an electronic system may be scanned to determine what shared libraries are loaded on the electronic system. Any suitable method may be used to accomplish step 405.

FIG. 4A is an illustration of an example embodiment of a step for scanning an electronic system to determine what shared libraries are loaded on the electronic system. In one embodiment, step 405 may be comprised of steps 407-415. In step 407, the shared libraries that are loaded within the address spaces of processes on the electronic system may be identified. In step 409, the shared libraries that are tracked by data structures found in the operating system loader may be identified. In step 411, the process memory may be scanned, memory page by memory page, to identify any shared libraries that are mapped therein. In step 413, each library that is found in steps 407-411 may be identified by calculating a digital hash. In step 415, the digital hash, as well as other information associated with the shared libraries, such as where it was discovered, what it may link to, what may link to it, may be stored.

Returning to FIG. 4, in step 420, for each shared library found in step 405, it may be determined whether or not the shared library is safe, and does not comprise malware. Any suitable method may be used to accomplish step 420.

Figure 4B:
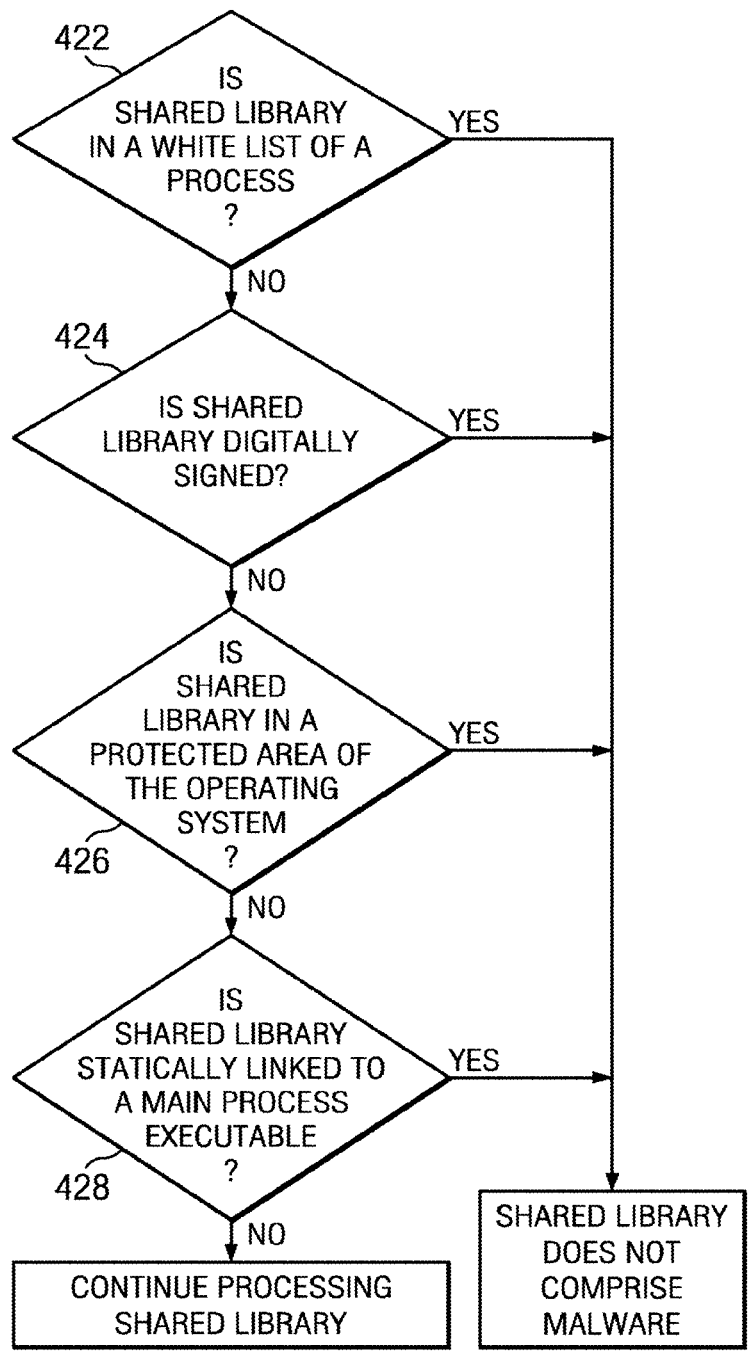
FIG. 4B is an illustration of an example embodiment of a step wherein for each shared library found on an electronic device, it may be determined whether or not the shared library is safe.

FIG. 4B is an illustration of an example embodiment of a step wherein for each shared library found on an electronic device, it may be determined whether or not the shared library is safe. In one embodiment, step 420 may be comprised of steps 422-428. In step 422, a white list of known safe shared libraries is compared to the shared library. If the shared library is on the list, it may be determined that the shared library does not comprise malware. In step 424, the shared library may be examined to see if it has been digitally signed. If it has been digitally signed, it may be determined that the shared library does not comprise malware. In step 426, it may be determined whether the shared library resides in a protected area of the operating system. If it resides in a protected area of the operating system, it may be determined that the shared library does not comprise malware. In step 426, it is determined whether the shared library is statically linked to a main process executable. If so, it may be determined that the shared library does not comprise malware. If not, the shared library may continue to be processed.

Returning to FIG. 4, in step 435, for each shared library found in step 405, it may be determined whether or not the shared library may comprise malware, and is thus suspicious. In one embodiment, step 435 may consider only those shared libraries which were not found to be safe in step 420. Any suitable method may be used to accomplish step 435.

Figure 4C:
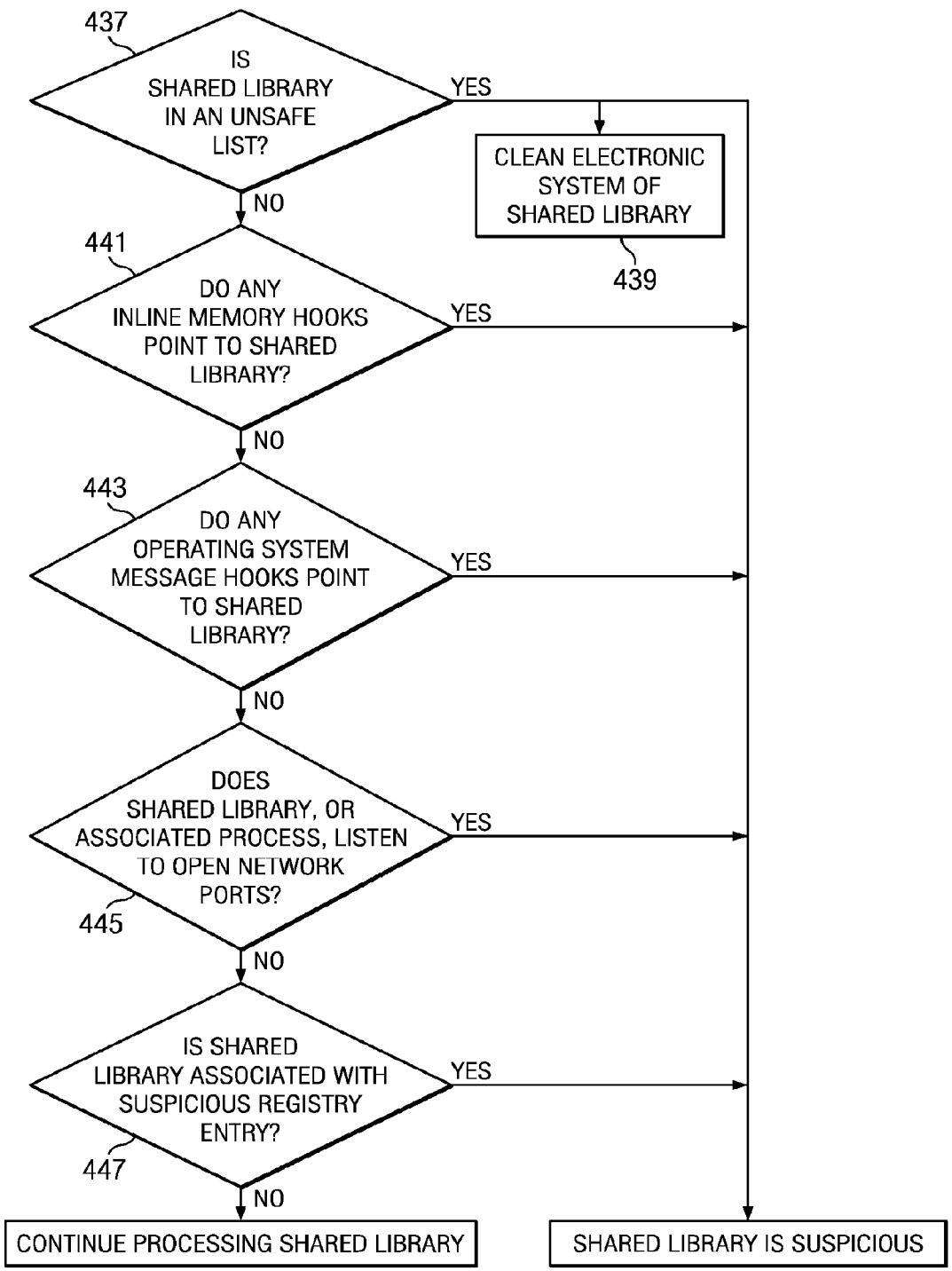
FIG. 4C is an illustration of an example embodiment of a step for determining whether or not a shared library may comprise malware, and is thus suspicious.

FIG. 4C is an illustration of an example embodiment of a step for determining whether or not a shared library may comprise malware, and is thus suspicious. In one embodiment, step 435 may be comprised of steps 437-447. In step 437, it may be determined whether the shared library is on an unsafe list. If so, the shared library may be determined to be suspicious. In one embodiment, if the shared library is determined to be suspicious based on its identification on an unsafe list, in step 439 the shared library may be cleaned from the electronic system. In step 441, it may be determined whether any inline memory hooks in the electronic system point to the shared library. If so, the shared library may be determined to be suspicious. In step 443, it may be determined whether any operating system message hooks point to the shared library. If so, the shared library may be determined to be suspicious. In step 445, it may be determined whether the shared library, or any processes linked to the shared library, is listening on open ports of a network device or process. If so, the shared library may be determined to be suspicious. In step 447, it may be determined whether the shared library is associated with a suspicious registry entry. If so, the shared library may be determined to be suspicious. If not, the shared library may continue to be processed.

Returning to FIG. 4, in step 450, for each shared library not determined in steps 420 or 435 to be safe or suspicious, the shared library may be determined to have an unknown status. In one embodiment, shared libraries with an unknown status may be recorded as such. In one embodiment, shared libraries with an unknown status may be treated as suspicious be default.

In step 455, information about the suspicious shared libraries may be transmitted to a server. Information may include an identifier, where the shared library was found, resources associated with the shared library, or any other suitable indication for determining whether a suspicious shared library may comprise malware.

In step 460, the shared library itself may be transmitted to a server. In one embodiment, the server may request the shared library itself.

In step 465, actions concerning the suspicious shared libraries may be received from the server. The actions may comprise instructions or information pertaining to a shared library. In one embodiment, instructions may comprise a designation of whether a not a shared library comprises malware. In one embodiment, actions may comprise instructions to be carried out to address the presence or absence of malware in the shared library. Any suitable action in response to the presence or absence of malware in shared library may be taken. For example, in step 470, a shared library determined to comprise malware may be cleaned from the electronic system. In step 475, a shared library determined to be safe may be added to the white list. In step 480, a shared library determined to comprise malware may be added to the unsafe list.

Figure 5:
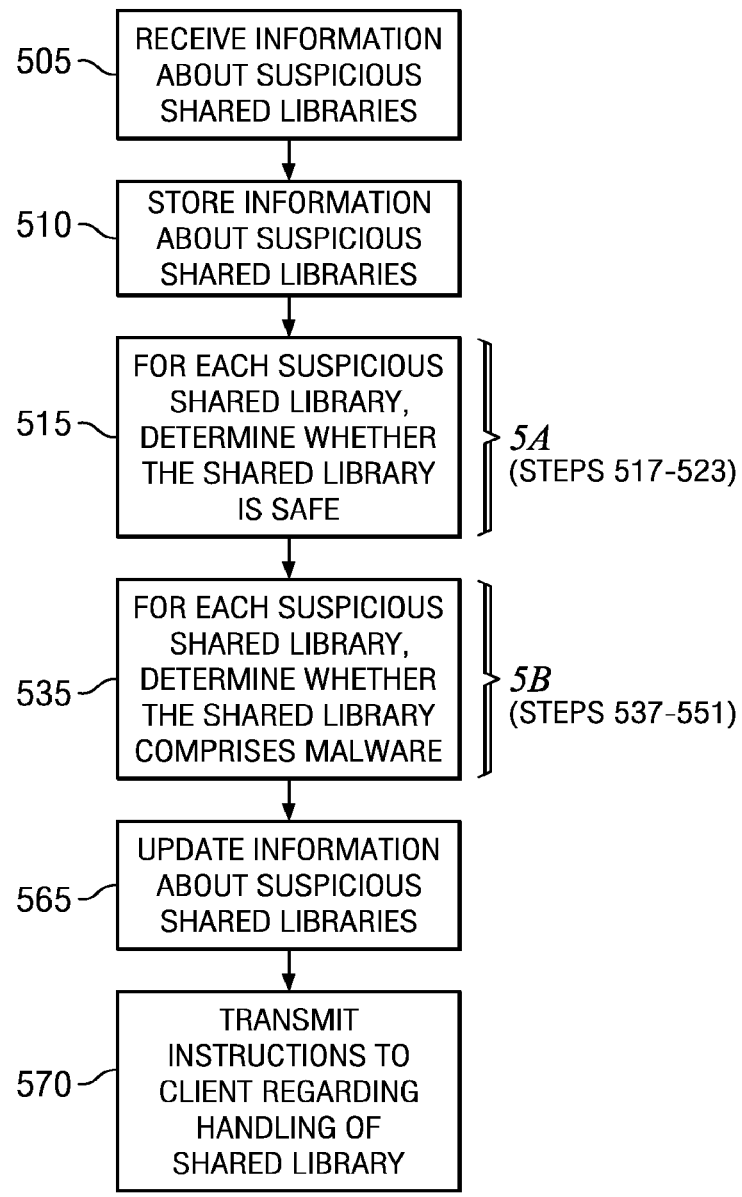
FIG. 5 is an illustration of an example method for providing analysis of suspicious shared libraries that may have been maliciously injected and loaded into an electronic system.

FIG. 5 is an illustration of an example method 500 to for providing analysis of suspicious shared libraries that may have been maliciously injected and loaded into an electronic system. In step 505, information may be received regarding one or more suspicious shared libraries to be analyzed. In step 510, information about each suspicious shared library may be stored. In one embodiment, information about each suspicious shared library may be stored in a reputation database. In one embodiment, information in the reputation database may be updated with the information received in step 510. For example, the number of instances, sources, and associated resources of a given shared library in the reputation database may be updated from information received about the given shared library.

In step 515, for each suspicious shared library, it may be determined whether for each suspicious library, the shared library does not comprise malware. Step 515 may comprise any suitable method of determining whether a suspicious shared library does not comprise malware.

Figure 5A:
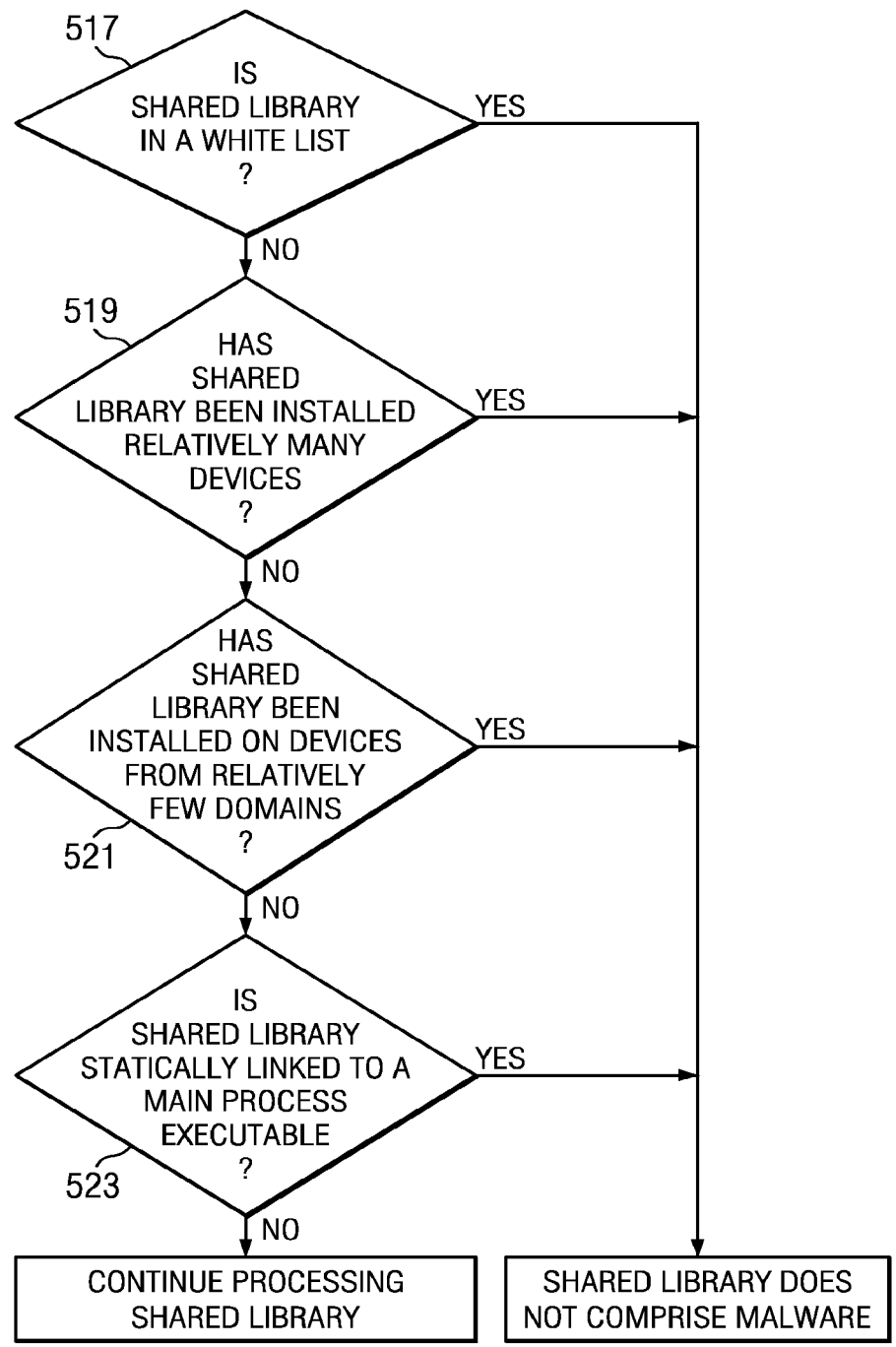
FIG. 5A is an illustration of an example embodiment of a step for determining whether a suspicious shared library does not comprise malware.

FIG. 5A is an illustration of an example embodiment of a step for determining whether a suspicious shared library does not comprise malware. In one embodiment, step 515 may be implemented by steps 517-523. In step 517, it may be determined whether the suspicious shared library is on a safe list. If so, the suspicious shared library may be determined to not comprise malware. In step 519, it may be determined whether the shared library has been installed on a relatively large number of electronic devices. If so, the suspicious shared library may be determined to not comprise malware. Any suitable threshold corresponding to a number of instances appearing in a given period of time, corresponding to distribution patterns of a safe shared library may be used. In step 521, it may be determined whether the shared library has been installed on devices from a relatively few number of domains. If so, the suspicious shared library may be determined to not comprise malware. Any suitable threshold corresponding to a number of instances appearing in a given period of time, corresponding to distribution patterns of a safe shared library may be used. In step 523, it may be determined whether the shared library is linked to the main process of an executable. If so, the suspicious shared library may be determined to not comprise malware. In not, the suspicious shared library may continue to be processed.

Returning to FIG. 5, in step 535, for each suspicious shared library, it may be determined whether the shared library does comprise malware. Step 535 may comprise any suitable method of determining whether a suspicious shared library comprises malware.

Figure 5B:
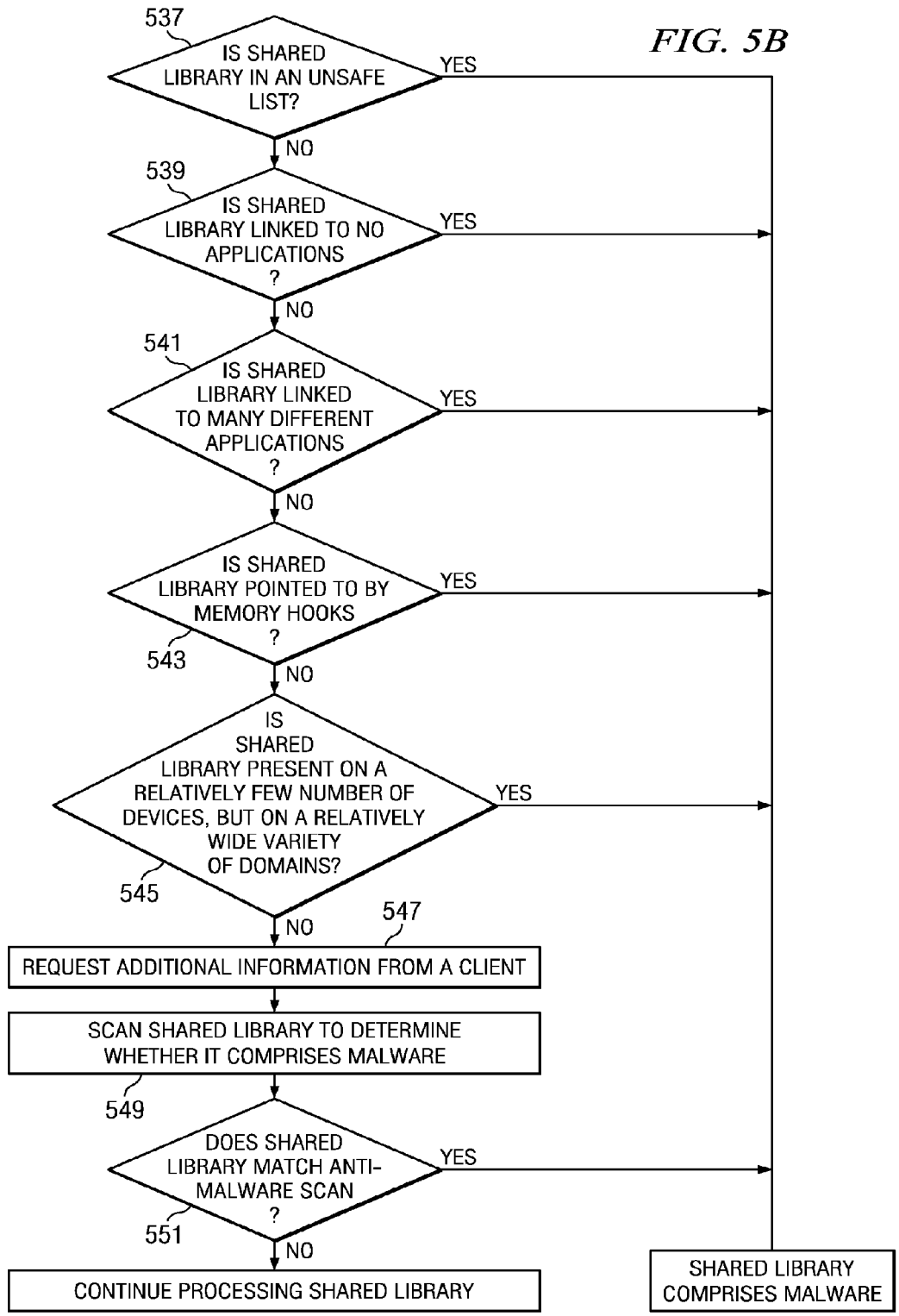
FIG. 5B is an illustration of an example embodiment of a step to determine whether a suspicious shared library comprises malware.

FIG. 5B is an illustration of an example embodiment of a step to determine whether a suspicious shared library comprises malware. In one embodiment, step 535 may comprise one or more of steps 537-551. In step 537, it may be determined whether a suspicious shared library appeared in an unsafe list. If so, the suspicious shared library may be determined to comprise malware. In step 539, it may be determined whether a suspicious shared library links to no applications. If so, the suspicious shared library may be determined to comprise malware. In step 541, it may be determined whether a suspicious shared library links to many different applications. If so, the suspicious shared library may be determined to comprise malware. Any suitable threshold corresponding to a number of associated applications may be used, wherein the threshold corresponds to behavior typical of malware. In step 543, it may be determined whether a suspicious shared library is pointed to by memory hooks. If so, the suspicious shared library may be determined to comprise malware. In step 545, it may be determined whether a shared library in present on a relatively few number of devices, but on a relatively large number of different domains. If so, the suspicious shared library may be determined to comprise malware. Any suitable threshold corresponding to a number of instances appearing in a given period of time on a number of domains, corresponding to distribution patterns of a shared library comprising malware may be used. In step 547, additional information may be requested from the sender of information about the suspicious shared libraries. In one embodiment, the actual shared library itself may be requested. In step 549, the actual shared library may be scanned using known anti-malware techniques. In step 551, it may be determined whether the scan found that the shared library comprised malware. If not, the shared library may continue to be processed, though its status as malware may not yet be determined.

Returning to FIG. 5, in step 565 information about the suspicious shared library may be updated. In step 570, any instructions regarding the handling of a shared library may be transmitted to a client.

The number and order of the steps of methods 400 and 500 may vary. Some steps of methods 400 and 500 may be optional. Additional steps may be used to accomplish methods 400 and 500. Methods 400 and 500 may be implemented using the system of FIGS. 1-3, or any other system operable to implement methods 400 and 500. In certain embodiments, methods 400 and 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method of evaluating a shared library, comprising:
   receiving, at a reputation server, information about a first suspicious shared library on an electronic device;

using a reputation application executing on a hardware processor of the reputation server, comparing historical data of activity of the first suspicious shared library against activity representative of shared libraries associated with malware, the historical data collected from one or more other electronic devices, the first suspicious shared library found in each of the one or more electronic devices, including:
  determining that the first suspicious shared library is unidentified in a list of trusted modules; and
  comparing a determined quantity of electronic devices on which the first suspicious shared library has been present against an upper threshold;
comparing, with the reputation application, a determined quantity of applications to which the first suspicious shared library has been linked against an application threshold; and
determining, with the reputation application, that the first suspicious shared library is malicious based upon:
  a determination that the first suspicious shared library is unidentified in a list of trusted modules; a determination that the quantity of electronic devices does not exceed the upper threshold; and
  a determination that the quantity of the applications to which the first suspicious library has been linked exceeds the application threshold.

2. The method of claim 1, further comprising:
receiving information about a second suspicious shared library on the electronic device at the reputation server;
comparing, with the reputation application, historical data of activity of the second suspicious shared library against the activity representative of shared libraries associated with malware, including:
  determining that the second suspicious shared library is unidentified in a list of trusted modules; and
  determining whether the second suspicious shared library has been linked to no applications; and
determining, with the reputation application, that the second suspicious shared library is safe based upon a determination that the second suspicious shared library has been linked to no applications.

3. The method of claim 1, further comprising, with the reputation application:
identifying a quantity of different system executable objects that include any hook that points to the first suspicious shared library, the system executable objects reported from a plurality of clients; and
determining that the first suspicious shared library is malicious is further based upon a determination that a plurality of different system executable objects include any hook that points to the first suspicious shared library.

4. The method of claim 1, further comprising, with the reputation application:
comparing a determined quantity of electronic devices on which the first suspicious shared library has been present against a lower device threshold;
comparing a determined quantity of different networks on which the electronic devices have resided against an upper network threshold; and
determining that the first suspicious shared library is malicious further based upon determinations that:
  the quantity of electronic devices is below the lower device threshold; and
  the quantity of different networks exceeds the upper network threshold.

5. The method of claim 1, further comprising, with the reputation application:
receiving information about a second suspicious shared library on the electronic device;
comparing historical data of activity of the second suspicious shared library against the activity representative of shared libraries associated with malware, including:
  determining that the second suspicious shared library is unidentified in a list of trusted modules; and
  comparing a determined quantity of different networks on which the second suspicious shared library has been present against a lower network threshold; and
determining that the second suspicious shared library is safe based upon a determination that the quantity of different networks is less than the lower network threshold.

6. At least one non-transitory computer readable medium including a reputation application, the reputation including computer-executable instructions carried on the non-transitory computer readable medium, the instructions readable by a processor, the instructions, when read and executed, for configuring the processor to:
receive information about a first suspicious shared library on an electronic device;
compare a determined quantity of applications to which the first suspicious shared library has been linked against an application threshold; and
compare historical data of activity of the first suspicious shared library against activity representative of shared libraries associated with malware, the historical data collected from one or more other electronic devices, the first suspicious shared library found in each of the one or more electronic devices, including:
  determining that the first suspicious shared library is unidentified in a list of trusted modules; and
  comparing a determined quantity of electronic devices on which the first suspicious shared library has been present against an upper threshold; and
determine that the first suspicious library is malicious based upon:
  a determination that -the first suspicious shared library is unidentified in a list of trusted modules;
  a determination that -the quantity of electronic devices does not exceed the upper threshold; and
  a determination that the quantity of the applications to which the first suspicious library has been linked exceeds the application threshold.

7. The article of claim 6, wherein the processor is further configured to:
receive information about a second suspicious shared library on the electronic device;
compare historical data of activity of the second suspicious shared library against the activity representative of shared libraries associated with malware, including:
  determining that the second suspicious shared library is unidentified in a list of trusted modules; and
  determining whether the second suspicious shared library has been linked to no applications; and
determine that the second suspicious shared library is safe based upon a determination that the second suspicious shared library has been linked to no applications.

8. The article of claim 6, wherein:
the processor is further configured to identify a quantity of different system executable objects that include any hook that points to the first suspicious shared library, the system executable objects reported from a plurality of clients; and determining that the first suspicious shared library is malicious is further based upon a determination that a plurality of different system executable objects include any hook that points to the first suspicious shared library.

9. The article of claim 6, wherein:
the processor is further configured to:
compare a determined quantity of electronic devices on which the first suspicious shared library has been present against a lower device threshold; and
compare a determined quantity of different networks on which the electronic devices have resided against an upper network threshold; and
determining that the first suspicious shared library is malicious is further based upon:
a determination that the quantity of electronic devices is below the lower device threshold; and
a determination that the quantity of different networks exceeds the upper network threshold.

10. The article of claim 6, wherein the processor is further configured to:
receive information about a second suspicious shared library on the electronic device:
compare historical data of activity of the second suspicious shared library against the activity representative of shared libraries associated with malware, including:
determining that the second suspicious shared library is unidentified in a list of trusted modules; and
comparing a determined quantity of different networks on which the second suspicious shared library has been present against a lower network threshold; and
determine that the second suspicious shared library is safe based upon a determination that the quantity of different networks is less than the lower network threshold.

11. A system for evaluation of malware, comprising:
a processor;
a reputation database including historical data of shared libraries;
a reputation server executed by the processor and configured to:
receive information about a first suspicious shared library;
compare a determined quantity of the applications to which the first suspicious shared library has been linked against an application threshold; and
compare historical data of activity of the first suspicious shared library against activity representative of shared libraries associated with malware, the historical data collected from one or more other electronic devices, the first suspicious shared library found in each of the one or more electronic devices, including:
determining that the first suspicious shared library is unidentified in a list of trusted modules; and
comparing a determined quantity of electronic devices on which the first suspicious shared library has been present against an upper threshold; and
determine that the first suspicious library is malicious based upon:
a determination that the first suspicious shared library is unidentified in a list of trusted modules; and
a determination that the quantity of electronic devices does not exceed the upper threshold; and
a determination that the quantity of the applications to which the first suspicious library has been linked exceeds the application threshold.

12. The system of claim 11, wherein:
the reputation server is further configured to:
receive information about a second suspicious shared library;
compare historical data of activity of the second suspicious shared library against the activity representative of shared libraries associated with malware, including:
determining that the second suspicious library is unidentified in a list of trusted modules; and
determining determine whether the second suspicious shared library has been linked to no applications; and
determine that the second suspicious shared library is safe based upon a determination that the second suspicious shared library has been linked to no applications.

13. The system of claim 11, wherein:
the reputation server is further configured to identify a quantity of different system executable objects that include any hook that points to the first suspicious shared library, the system executable objects reported from a plurality of clients; and
determining that the first suspicious shared library is malicious is further based upon a determination that a plurality of different system executable objects include any hook that points to the first suspicious shared library.

14. The system of claim 11, wherein:
the reputation server is further configured to:
compare a determined quantity of electronic devices on which the first suspicious shared library has been present against a lower device threshold; and
compare a determined quantity of different networks on which the electronic devices have resided against an upper network threshold; and
determine that the first suspicious shared library is malicious is further based upon:
a determination that the quantity of electronic devices is below the lower device threshold; and
a determination that the quantity of different networks exceeds the upper network threshold.

15. The system of claim 11, wherein the reputation server is further configured to:
receive information about a second suspicious shared library;
compare historical data of activity of the second suspicious shared library against the activity representative of shared libraries associated with malware, including:
determining that the second suspicious shared library is unidentified in a list of trusted modules; and
comparing a determined quantity of different networks on which the second suspicious shared library has been present against a lower network threshold; and
determine that the second suspicious shared library is safe based upon a determination that the quantity of different networks is less than the lower network threshold.

* * * * *